United States Patent
Rennies et al.

(10) Patent No.: US 12,372,464 B2
(45) Date of Patent: Jul. 29, 2025

(54) REFLECTIVITY MEASUREMENT APPARATUS AND METHOD OF MEASURING REFLECTIVITY THEREFOR

(71) Applicant: Melexis Technologies NV, Tessenderlo (BE)

(72) Inventors: Jos Rennies, Tessenderlo (BE); Luc Buydens, Tessenderlo (BE)

(73) Assignee: MELEXIS TECHNOLOGIES NV, Tessenderlo (BE)

( * ) Notice: Subject to any disclaimer, the term of this patent is extended or adjusted under 35 U.S.C. 154(b) by 329 days.

(21) Appl. No.: 18/182,010

(22) Filed: Mar. 10, 2023

(65) Prior Publication Data
US 2023/0333014 A1    Oct. 19, 2023

(30) Foreign Application Priority Data

Apr. 14, 2022   (EP) .................................... 22168621

(51) Int. Cl.
*G01N 21/55*   (2014.01)

(52) U.S. Cl.
CPC ....... *G01N 21/55* (2013.01); *G01N 2201/123* (2013.01); *G01N 2201/12746* (2013.01)

(58) Field of Classification Search
CPC ............. G01N 21/55; G01N 2201/123; G01N 2201/12746
See application file for complete search history.

(56) References Cited

U.S. PATENT DOCUMENTS

| | | | | |
|---|---|---|---|---|
| 5,705,807 A | * | 1/1998 | Throngnumchai | ... H10F 39/803 356/221 |
| 6,132,084 A | * | 10/2000 | Whipple, III | ........... G01J 5/041 374/149 |
| 2005/0029453 A1 | | 2/2005 | Allen et al. | |

FOREIGN PATENT DOCUMENTS

| JP | S55152427 A | 11/1980 | |
|---|---|---|---|
| TW | 201349941 A | 12/2013 | |
| WO | WO-2015018885 A1 * | 2/2015 | ........... H05B 1/0266 |

OTHER PUBLICATIONS

Gupta Dhritiman et al: "Photoconductivity 1,13 anisotropy study in uniaxially aligned polymer based planar photodiodes", Organic Electronics, Elsevier, Amsterdam, NL, vol. 13, No. 1, Oct. 7, 2011 (Oct. 7, 2011), pp. 36-42, XP028856752, ISSN: 1566-1199, DOI: 10.1016/J.ORGEL.2011.08.034 * figure 4a *.
(Continued)

*Primary Examiner* — David P Porta
*Assistant Examiner* — Fani Polyzos Boosalis
(74) *Attorney, Agent, or Firm* — Harness, Dickey & Pierce, P.L.C.

(57) ABSTRACT

In a heating appliance comprising a substrate for receiving an item of cookware, a method of measuring reflectivity comprises emitting a time-varying electromagnetic signal from a first side of the substrate, a portion of the time-varying electromagnetic signal propagating through the substrate. Electromagnetic radiation is then received at the first side of the substrate, the received electromagnetic radiation comprising a background ambient component received and a component reflected by the substrate. A gain factor is applied to translate the received electromagnetic radiation to a receive electrical signal. An offset signal component is then identified from the receive electrical signal, the offset signal component arising from the background ambient component of the received electromagnetic radiation. The (Continued)

gain factor from the offset signal component is then estimated using a characterisation of the offset signal component, and the reflectivity is calculated using the receive electrical signal and the estimated gain factor.

14 Claims, 3 Drawing Sheets

(56) References Cited

OTHER PUBLICATIONS

European Search Report for European Patent Application No. EP22168621.5 on Oct. 4, 2022.

* cited by examiner

REFLECTIVITY MEASUREMENT APPARATUS AND METHOD OF MEASURING REFLECTIVITY THEREFOR

CROSS-REFERENCE TO RELATED APPLICATION(S)

The present application claims priority under 35 U.S.C. § 119 to European Patent Application No. 22168621.5, filed Apr. 14, 2022, the entire contents of which are incorporated herein by reference.

FIELD

The present invention relates to a reflectivity measurement apparatus of the type that, for example, employs a source of electromagnetic radiation and an optical detector unit configured to measure reflected electromagnetic radiation from an item being measured. The present invention also relates to a method of measuring reflectivity of a received electromagnetic signal, the method being of the type that, for example, emits electromagnetic radiation towards a surface of an item to be measured and measures electromagnetic radiation reflected from the surface of the item.

BACKGROUND

In the field of cooking appliances, particularly inductive cooking appliances, it is advantageous to determine, contactlessly, the temperature of cookware, for example a cooking pot or saucepan, because the inductive cooking appliance, for example a stove or hob, does not possess a heating element per se in the sense of an element that heats up, and so the temperature of the heating "source" cannot be measured directly; only the amount of energy induced in the cookware is being controlled, not the resulting cookware temperature.

Several solutions aimed at measuring the temperature of cookware placed on an inductive cooking top exist. Some of these solutions comprise measuring the temperature of the cookware using a contactless infrared temperature sensor placed underneath the cooking top.

However, in order to be able to use multiple, different items of cookware, such temperature measuring solutions need to measure accurately a value for the infrared emissivity of the different items of cookware being measured. Quantitatively, emissivity is the ratio of the thermal radiation from a surface to the radiation from an ideal black surface at the same temperature, as given by the Stefan-Boltzmann law. The ratio varies from 0 to 1, and can be measured based on the equation: emissivity=1−reflectance. Thus, by measuring the amount of known radiation reflected by a body the emissivity can be calculated.

The infrared emissivity of a base of an item of cookware largely depends on many characteristics of the surface of the base of the item of cookware, including for example material, colour and processing conditions. Additionally, variations exist between cookware of the identical design, because the infrared emissivity changes with the presence of contamination, for example cooking oil or dirt, adhering to the base of the item of cookware.

JP2013/004328 A describes a circuit for measuring emissivity using an infrared Light Emitting Diode (LED) configured to emit infrared light towards cookware, through a cooking top, and a phototransistor both arranged in an electrical circuit to generate a time-varying emission of infrared light and to process received reflected infrared light for a processing unit to determine emissivity.

Two possible states of the cookware can exist: the cooking top has nothing disposed thereon, and the cooking top has an item of cookware disposed thereon. In both scenarios, it is challenging to measure emissivity accurately owing to variations in the gain of the photodetector device.

SUMMARY

According to a first aspect of the present invention, there is provided a method of a method of measuring reflectivity in a heating appliance comprising a substrate for receiving an item of cookware, the method comprising: emitting a time-varying electromagnetic signal from a first side of the substrate, a portion of the time-varying electromagnetic signal propagating through the substrate; receiving electromagnetic radiation at the first side of the substrate, the received electromagnetic radiation comprising a background ambient component of electromagnetic radiation received and a reflected component of the time-varying electromagnetic signal reflected by the substrate; applying a gain factor to translate the received electromagnetic radiation to a receive electrical signal, the gain factor applied being responsive to the background ambient component of electromagnetic radiation received; identifying an offset signal component from the receive electrical signal, the offset signal component arising from the background ambient component of electromagnetic radiation received; estimating the gain factor from the offset signal component using a characterisation of the offset signal component; and calculating the reflectivity using the receive electrical signal and the estimated gain factor.

Calculating the reflectivity may further comprises: identifying the reflected component of the time-varying electromagnetic signal; and compensating the identified reflected component of the time-varying electromagnetic signal using the estimated gain factor.

Calculating the reflectivity may further comprises: attenuate the identified offset signal component from the receive electrical signal.

The method may further comprise: identifying the reflected component of the time-varying electromagnetic signal; and using the estimated gain factor to calculate a parameter of emission of the time-varying electromagnetic signal; the calculated parameter of emission of the time-varying electromagnetic signal may compensate the identified reflected component of the time-varying electromagnetic signal.

The method may further comprise: analysing the receive electrical signal and repeatedly extracting the offset signal component from the receive electrical signal.

According to a second aspect of the present invention, there is provided a method of measuring reflectivity of a substrate of an inductive cooking appliance, the method comprising: measuring reflectivity of the substrate in the presence of the background ambient component of electromagnetic radiation as set forth above in relation to the first aspect of the present invention.

The measured reflectivity of the substrate may be a reference reflectivity.

According to a third aspect of the present invention, there is provided a method of measuring the reflectivity of an item of cookware disposed on a substrate of an inductive cooking appliance, the method comprising: measuring reflectivity of the substrate as set forth above in relation to the second aspect of the present invention; placing the item of cookware on the substrate; and emitting another time-varying electromagnetic signal from the first side of the substrate, a portion of the another time-varying electromagnetic signal propagating through the substrate; receiving further electromagnetic radiation at the first side of the substrate, the further received electromagnetic radiation comprising a first reflected component of the time-varying electromagnetic signal reflected by the substrate and a second reflected component of the time-varying electromagnetic signal reflected by the item of cookware; translating the further received electromagnetic radiation to another receive electrical signal; and calculating the reflectivity additionally using the another receive electrical signal.

The method may further comprise: applying the gain factor to translate the further received electromagnetic radiation to another receive electrical signal; the gain factor may be applied responsive to the background ambient component of electromagnetic radiation received.

The time-varying electromagnetic signal and the another time-varying electromagnetic signal may share a common time-varying electrical drive signal; and calculating the reflectivity may further comprise: calculating a fraction of the time-varying electromagnetic signal that is received as the second reflected component of the time-varying electromagnetic signal.

Calculating the fraction may comprise using the gain factor, the receive electrical signal, and the another receive electrical signal, and a predetermined reflectivity value of the substrate.

The reflectivity may be calculated using the following equation:

$$\frac{(A_{meas2} - A_{meas1}) \times R_s}{A_{meas1}}$$

where $A_{meas2}$ is an amplitude of the another receive electrical signal, $A_{meas1}$ is an amplitude of the receive electrical signal compensated using the estimated gain factor, and $R_S$ is the predetermined reflectivity value of the substrate.

According to a fourth aspect of the present invention, there is provided a method of heating cookware inductively, the method comprising: measuring reflectivity of an item of cookware as set forth above in relation to the third aspect of the present invention; receiving a demand for inductive heating after measuring the reflectivity of the item of cookware; and generating an inductive electromagnetic heating signal in response to the demand for inductive heating.

The substrate may be a cooktop. An emissivity may be calculated using the measured reflectivity of the item of cookware.

According to a fifth aspect of the present invention, there is provided a reflectivity measurement apparatus comprising: an electromagnetic illumination circuit configured to emit a time-varying electromagnetic signal from a first side of a substrate of a heating appliance, the time-varying electromagnetic signal propagating, when in use, through the substrate; a photodetector circuit configured to receive electromagnetic radiation at the first side of the substrate, the received electromagnetic radiation comprising a background ambient component of electromagnetic radiation and a reflected component of the time-varying electromagnetic signal reflected by the substrate; the photodetector circuit is configured to apply a gain factor to translate the received electromagnetic radiation to a receive electrical signal, the gain factor applied being responsive to the background ambient component of electromagnetic radiation received; a signal processing unit configured to identify an offset signal component from the receive electrical signal, the offset signal component arising from the background ambient component of the received electromagnetic radiation; wherein the signal processing unit is configured to estimate the gain factor from the offset signal component using a characterisation of the offset signal component; and the signal processing unit is configured to calculate the reflectivity using the receive electrical signal and the estimated gain factor.

According to a sixth aspect of the present invention, there is provided an inductive heating apparatus comprising: a reflectivity measurement apparatus as set forth above in relation to the fifth aspect of the present invention.

It is thus possible to provide an apparatus and method that provide a measure of reflectance with improved accuracy. The measurement of reflectance is not distorted by the presence of ambient light received by an optical detector unit. By improving the accuracy of the measurement of reflectance, emissivity can be calculated with greater accuracy and thus temperature of an item to be measured can be calculated with greater accuracy.

BRIEF DESCRIPTION OF THE DRAWINGS

At least one embodiment of the invention will now be described, by way of example only, with reference to the accompanying drawings, in which.

DETAILED DESCRIPTION OF THE EXAMPLE EMBODIMENTS

Throughout the following description, identical reference numerals will be used to identify like parts.

Figure 1:
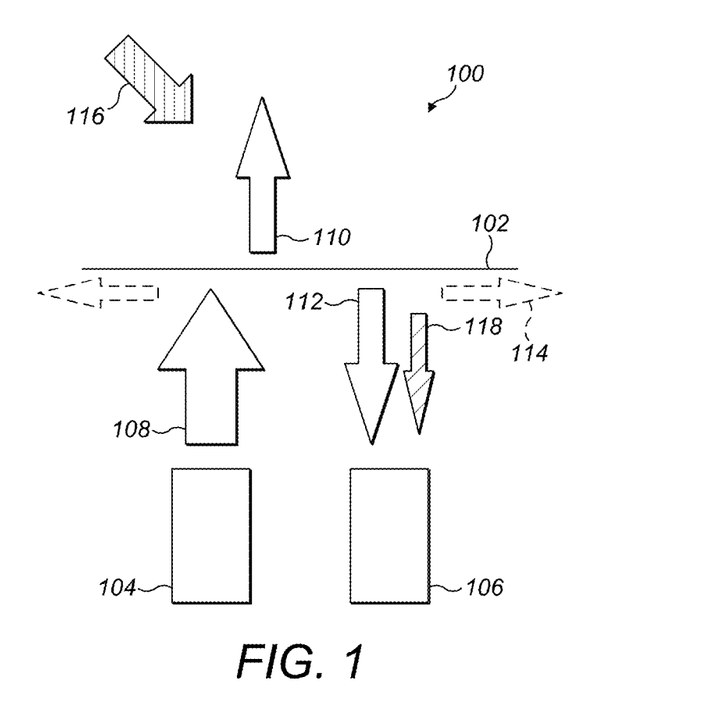
FIG. 1 is a schematic diagram of a cooking station of a cooking appliance.

Referring to FIG. 1, a cooking appliance 100, for example an inductive cooking stove or hob, comprises a substrate 102, for example a cooking top, for receiving one or more items of cookware thereon. In this example, a single cooking station is described, but the skilled person will appreciate that the cooking appliance 100 can comprise a greater number of cooking stations to receive multiple items of cookware, respectively. The substrate 102 is formed from a ceramic material, but any other suitable material can be employed. Although not show, the cooking appliance 100 comprises a heating unit, in this example an induction coil operably coupled to a control and drive system.

A measurement apparatus of the cooking appliance 100 comprises an illumination unit 104 and an optical detector unit 106, respectively disposed at a first side of the substrate 102.

Figure 2:
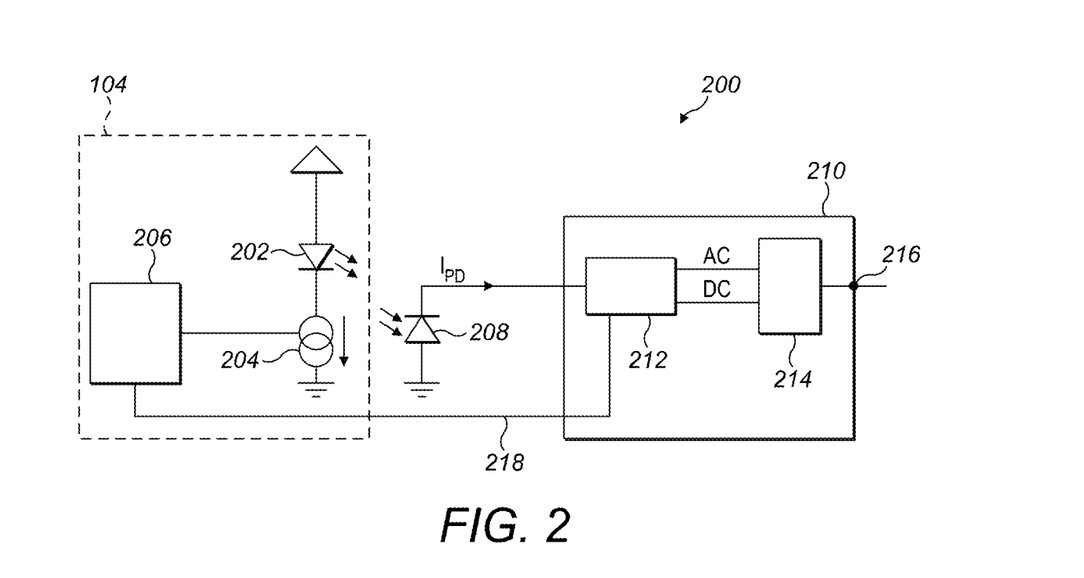
FIG. 2 is a schematic diagram of a measurement apparatus employed by the appliance of FIG. 1 and constituting an embodiment of the invention.

Turning to FIG. 2, the measurement apparatus comprises a measurement circuit 200 comprising a positive supply operably coupled to an anode of an infrared LED 202. A cathode of the infrared LED 202 is coupled to ground potential via a controllable current source 204, for example a Field Effect Transistor (FET) or to a bipolar junction transistor. An LED driver unit 206, having a first output coupled to an input of the controllable current source 204, for example a gate terminal of the FET transistor or a base terminal of the bipolar transistor mentioned above. The LED driver unit 206 is arranged to control the current flowing through the controllable current source 204. This can be achieved, for example in the case of FET transistor, by controlling the gate voltage of the FET transistor. The infrared LED 202, the controllable current source 204 and the LED driver unit 206 constitute the illumination unit 104.

A photodiode 208, is arranged in a reverse bias configuration, having an anode terminal connected to ground potential and a cathode terminal coupled to a first input terminal of a signal processing unit 210. Although a photodiode arrangement is specifically described above, the skilled person should appreciate that, in other examples, other types of photodetector device and configurations can be employed.

The signal processing unit 210 comprises a signal separation circuit 212 having a first input coupled to the input of the signal processing unit 210. The signal separation unit 212 serves to output separately AC and the DC components of an output signal of the photodiode 208. The signal processing unit 210 further comprises an emissivity calculation unit 214 operably coupled to the signal separation unit 212, an AC output of the signal separation unit 212 and a DC output of the signal separation unit 212 being coupled to an AC input and a DC input of the emissivity calculation unit 214, respectively. An output of the emissivity calculation unit 214 is coupled to an emissivity output terminal 216 of the signal processing unit 210. The emissivity output terminal 216 of the signal processing unit 210 is coupled to a processing resource, for example a microprocessor (not shown).

The LED driver unit 206 is operably coupled to the signal processing unit 210, thereby enabling providing a bi-directional communication link 218 between the LED diver unit 206 and the signal processing unit 210.

Figure 3:
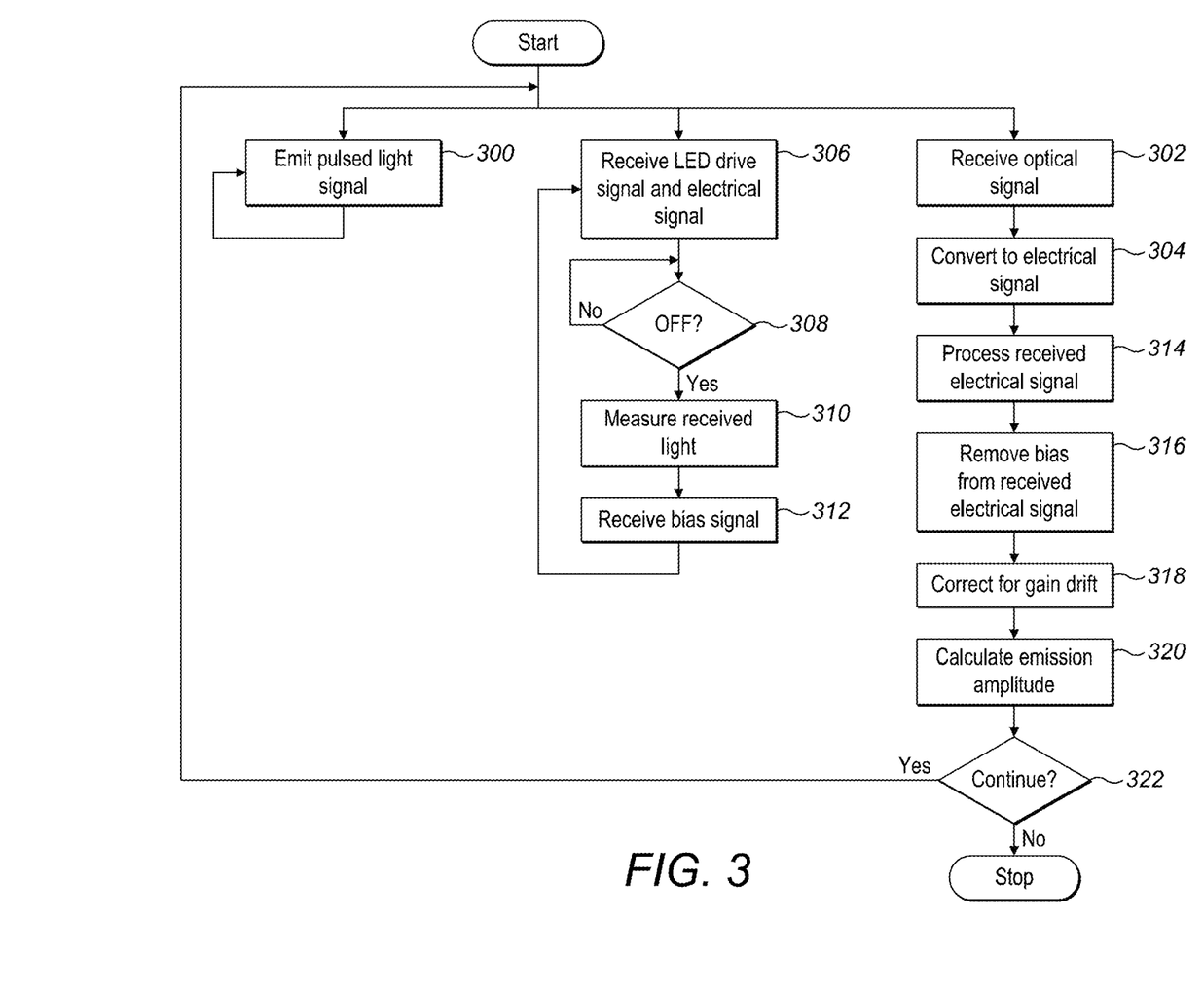
FIG. 3 is a flow diagram of a method of measuring constituting another embodiment of the invention.

In operation (FIG. 3), and in the state of FIG. 1, cookware is not disposed on the cooking top 102. Upon being powered up, the infrared LED 202 of the measurement circuit 200 emits (Step 300) pulsed infrared light 108 under the control of the LED driver unit 206, which is directed towards the cooking top 102. In this regard, the LED driver unit 206 generates a pulsed drive waveform, for example a square waveform constituting a time-varying electromagnetic signal and having a predetermined duty cycle of alternating ON and OFF portions. A portion of the emitted pulsed infrared light 108 propagates through the cooking top 102, hereinafter referred to as transmissive light 110. Another portion of the emitted pulsed infrared light 108 is reflected by the cooking top 102, hereinafter referred to as reflected light 112. A further portion of the emitted infrared light 108 is scattered by the cooking top 102, hereinafter referred to as scattered light 114. Additionally, background ambient light 116 is present in varying intensities, part of which propagates through the cooking top 102, as transmissive ambient light 118, but can also originate from sources beneath the cooking top 102.

Figure 4A:
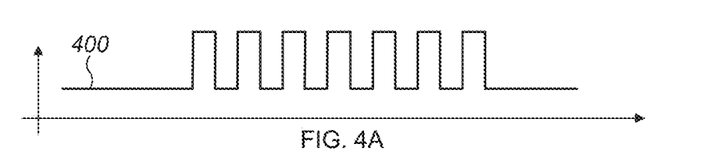
FIG. 4A is a schematic graph of a photodetector signal received by the measurement apparatus of FIG. 2.

Substantially contemporaneously, the photodiode 208 receives (Step 302) light reflected by the cooking top 102 and received through the cooking top 102, for example the reflected light 112 and the transmissive ambient light 118. The light received by the photodiode 208 is translated (Step 304) to an electrical signal 400 (FIG. 4A), for example an electrical current signal, $I_{PD}$. In this regard, it has been discovered that the gain factor applied by the photodiode 208, or indeed other photodetector devices, is influenced by the receipt of the transmissive ambient light. The transmissive light is typically constant and so constitutes a DC signal. As such, the gain characteristic of the photodiode 208 is characterised with respect to DC signal level a priori and used to correct for the drift in the gain factor applied by the photodiode 208 as will be described later herein. As such, the signal separation unit 212 receives, through the communication link 218 (Step 306), the pulsed drive waveform generated by the LED driver unit 206 and the electrical signal, $I_{PD}$, received at the first input terminal of the signal processing unit 214. Although, in this example, the electrical output signal, $I_{PD}$, of the photodiode 208 is an electrical current, the skilled person should appreciate other configurations are possible, for example by way of presenting a voltage signal to the signal separation unit 212.

Upon receipt of both the electrical current signal, $I_{PD}$, from the photodiode 208 and the pulsed drive waveform from the LED driver unit 206, the signal separation unit 218 separates the DC component and AC component of the electrical current signal, $I_{PD}$, received at the first input terminal of the signal processing unit 210. The DC component can also be considered as the level of the electrical current signal, $I_{PD}$, during the OFF portion of the pulsed drive waveform, whereas the AC component can be considered as the electrical current signal, $I_{PD}$, with the DC component removed.

The signal separation unit 212 analyses (Step 308) the pulsed drive waveform received from the LED driver unit 206 and identifies an OFF portion of the pulsed drive waveform and measures (Step 310) a corresponding amplitude of the electrical signal, which corresponds to a period of time when the light received by the photodiode 208 is attributable to the transmissive ambient light 118 and not the emissions of the infrared LED 202, i.e. the DC component as mentioned above. Additionally, while the signal separation unit 212 is analysing (Step 308) the pulsed drive waveform, the signal separation unit 212 identifies the ON portion of pulsed drive waveform that does not correspond to the DC component, and thereby the signal separation unit 212 obtains the AC component of the electrical current signal, $I_{PD}$, received at the first input terminal of the signal processing unit 210.

It should be appreciated the above-described technique for obtaining the DC and AC components of the electrical current signal, $I_{PD}$, is just one of a number of different techniques to obtain the components of the electrical current signal, $I_{PD}$, using the pulsed drive waveform generated by the LED driver unit 206, and other suitable techniques can be employed. In any event, by separating the DC and AC components of the electrical current signal, $I_{PD}$, it is possible to obtain an estimate of the background illumination (DC component) and the amplitude of the pulsed signal (AC component) as received by the photodiode 208.

In response to the measurement of the amplitude of the electrical current signal, $I_{PD}$, during the OFF portion of the pulsed drive waveform, the emissivity calculation unit 214 receives (Step 312) a offset measurement signal 402 (FIG. 4B) from the signal separation unit 212, the offset measurement signal 402 being a measure of amplitude corresponding to the measured amplitude of the electrical signal. The offset measurement signal 402 is maintained until the amplitude of the electrical current signal, $I_{PD}$, is measured again during, in this example, a subsequent OFF portion of the pulsed drive waveform. The above process is repeated (Steps 306 to 312) while emissivity measurements are required.

Figure 4B:
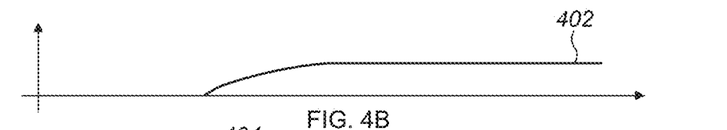
FIG. 4B is a schematic graph of an extracted bias signal generated by the measurement apparatus of FIG. 2.
Figure 4C:
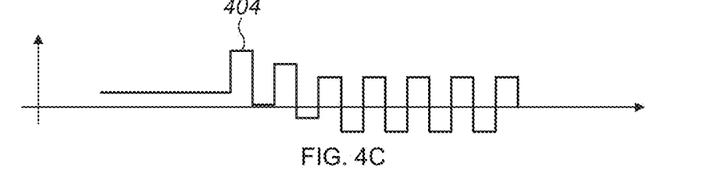
FIG. 4C is a schematic graph of a calibrated photodetector signal generated by the measurement apparatus of FIG. 2.

At the emissivity calculation unit 214, the AC component of the electrical current signal, $I_{PD}$, 400 is received and processed (Step 314) so as to amplify the AC component of received electrical current signal, $I_{PD}$, 400. Thereafter, the offset measurement signal 402 received from the signal separation unit 212 is applied by the emissivity calculation unit 214 in order to remove (Step 316) bias present in the received electrical current signal, $I_{PD}$, 400 attributable to the presence of the transmissive ambient light 118, thereby yielding a partially compensated electrical signal 404 (FIG. 4C).

Following generation of the partially compensated electrical signal 404, the emissivity calculation unit 214 corrects (Step 318) the partially compensated electrical signal 404 for the gain drift experienced during generation of the received electrical current signal, $I_{PD}$, 400 as a result of the presence of the transmissive ambient light 118. In this regard, the emissivity calculation unit 214 comprises the a priori characterisation of the gain of the photodiode 208 and uses the offset measurement signal 402 to obtain a gain factor, which is subsequently applied to the partially compensated electrical signal 404 in order to compensate the partially compensated electrical signal further. Thereafter, the emissivity calculation unit 214 calculates (Step 320) an amplitude, $A_d$, of the time-varying electromagnetic signal emitted by the photodiode 208. In this regard, the reflectivity of the substrate 102, $R_S$, is known and the amplitude of the compensated electrical signal, $A_{meas1}$, is measured by the emissivity calculation unit 214. Consequently, the amplitude, $A_d$, is calculated by the emissivity calculation unit 214 using the following equation:

$$A_d = \frac{A_{meas1}}{R_s} \quad (1)$$

The above process (Steps 302, 304, and 314 to 320) are repeated for as long as measurement is required (Step 322).

Figure 5:
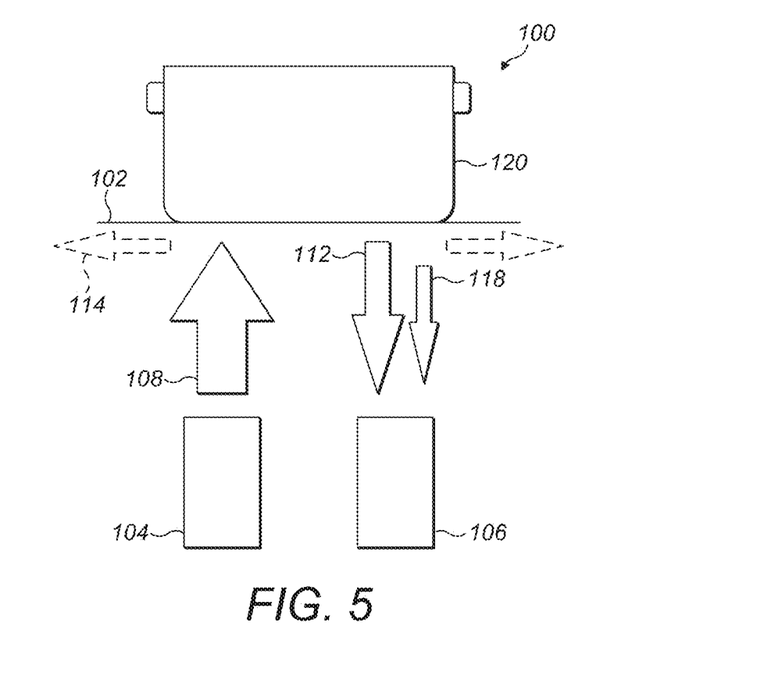
FIG. 5 is a schematic diagram of the cooking appliance of FIG. 1 when an item of cookware is place upon a cooking top thereof.

The above example relates to measurement of the amplitude, $A_d$, of the time-varying electromagnetic signal emitted by the photodiode 208 when an item of cookware is not disposed on the cooking top 102. Referring to FIG. 5, in another example, the above apparatus and method are employed when the item of cookware 120 is disposed on the cooking top 102 and where measurement of reflectivity suffers from bias attributable to the presence of the transmissive ambient light 118. In this regard, the amplitude, $A_d$, of the time-varying electromagnetic signal calculated in respect of the substrate 102 without the presence of the item of cookware 120 is used when calculating the reflectivity of the item of cookware 120 and hence emissivity thereof.

Having previously calculated the amplitude, $A_d$, and measured the amplitude of the compensated electrical signal, $A_{meas1}$, the item of cookware 120 can be placed on the cooking top 102 for measurement. In this regard, the item of cookware 120 is placed on the substrate 102 and the infrared LED 202 emits the pulsed infrared light 108 as the time-varying electromagnetic signal as previously described, but the time-varying electromagnetic radiation is now computationally treated as another distinct time-varying electromagnetic signal from the first side of the substrate 102, but the time-varying electrical drive signal used to generate the electromagnetic signals is nevertheless common to both electromagnetic signals. Again, a portion of the pulsed infrared light 108 propagates through the substrate 102.

While the infrared LED 202 emits the pulsed infrared light 108, the photodiode 208 receives further electromagnetic radiation (distinct from the electromagnetic radiation received when the item of cookware 120 was not placed on the cooking top 102) at the first side of the substrate 102, the further received electromagnetic radiation comprising a first reflected component of the time-varying electromagnetic signal reflected by the substrate 102 and a second reflected component of the time-varying electromagnetic signal reflected by the item of cookware 120. Assuming ambient light is still present, the gain factor is re-calculated and then applied to translate the further received electromagnetic radiation to another received electrical current signal, which has compensation applied thereto. Of course, where ambient light is below a threshold value considered not materially to affect measurement of reflectivity within predetermined tolerances, the skilled person will appreciate that the gain factor is not re-calculated and applied. The AC component of the received electric current signal attributable to the received further electromagnetic radiation is provided by the signal separation unit 212 and used by the emissivity calculation unit 214 to measure a second amplitude of the received electrical current signal, $A_{meas2}$. Once the second amplitude of the received electrical current signal, $A_{meas2}$ has been measured, the reflectivity of the item of cookware 120 can then be calculated as follows.

To calculate the reflectivity of the item of cookware 120, the emissivity calculation unit 214 calculates what fraction of the time-varying electromagnetic signal is received as the second reflected component of the time-varying electromagnetic signal 108. The reflectivity of the item of cookware 120 is therefore calculated using the following equation:

$$\frac{(A_{meas2} - A_{meas1}) \times R_s}{A_{meas1}} \quad (2)$$

From the reflectivity calculated in respect of the item of cookware 120, the emissivity can be calculated by subtracting the reflectivity calculated from unity.

In this regard, by using equation (2), the reflectivity of the substrate 102 is used as a reference reflectivity. As such, any changes over time to the measurement setup, for example due to temperature variations and/or ageing, are automatically compensated.

The calculated emissivity is then communicated to the processing resource for calculation of the temperature of the item of cookware 120 using the calculated emissivity.

The reflectivity calculated can thus be employed in a heating appliance (not shown), for example a cooking appliance, such as an inductive heating appliance, such as a stove. The appliance receives a demand for inductive heating from a user after measuring the reflectivity of an item of cookware 120 placed on the cooking top 102. The appliance then generates an inductive electromagnetic heating signal in response to the demand for inductive heating from the user and can control the inductive heating signal to ensure a desired temperature of the item of cookware 120 is attained.

Although the above examples relate to removal of the electrical offset attributable to the transmissive ambient light 118 by subtraction from the received electrical signal, in another embodiment, the signal separation unit 212 can provide the offset measurement signal 402 to the LED driver unit 206 as a feedback signal, which feedback signal can be used to adjust the waveform generated by the LED driver unit 206 in order to obviate or at least mitigate the bias in the electrical current signal, $I_{PD}$, 400 received by the signal processing unit 210. In this regard, the feedback signal can be used to calculate any suitable parameter of emission of the infrared LED 202 that can be used to compensate the AC component of the received electrical current signal, $I_{PD}$, 400. In such an example, the signal separation unit 212 is a signal conditioning circuit providing, for example amplification, and the DC component feed of the signal conditioning circuit is not coupled to the emissivity calculation unit 214, but instead is coupled to the input of the LED driver unit 206 via the communications link 218. The emissivity calculation unit 214 continues to calculate emissivity from the AC component of the received electrical current signal, $I_{PD}$, 400, and measurement of temperature is subsequently performed by the microprocessor as described above.

What is claimed is:

1. A method of measuring reflectivity in a heating appliance comprising a substrate for receiving an item of cookware, the method comprising:
    emitting a time-varying electromagnetic signal from a first side of the substrate, a portion of the time-varying electromagnetic signal propagating through the substrate;
    receiving electromagnetic radiation at the first side of the substrate, the received electromagnetic radiation comprising a background ambient component of electromagnetic radiation received and a reflected component of the time-varying electromagnetic signal reflected by the substrate;
    applying a gain factor to translate the received electromagnetic radiation to a receive electrical signal, the gain factor applied being responsive to the background ambient component of electromagnetic radiation received;
    identifying an offset signal component from the receive electrical signal, the offset signal component arising from the background ambient component of electromagnetic radiation received;
    estimating the gain factor from the offset signal component using a characterisation of the offset signal component; and
    calculating the reflectivity using the receive electrical signal and the estimated gain factor.

2. The method according to claim 1, wherein calculating the reflectivity further comprises:
    identifying the reflected component of the time-varying electromagnetic signal; and
    compensating the identified reflected component of the time-varying electromagnetic signal using the estimated gain factor.

3. The method according to claim 1, wherein calculating the reflectivity further comprises:
    attenuate the identified offset signal component from the receive electrical signal.

4. The method according to claim 1, further comprising:
    identifying the reflected component of the time-varying electromagnetic signal; and using the estimated gain factor to calculate a parameter of emission of the time-varying electromagnetic signal, the calculated parameter of emission of the time-varying electromagnetic signal compensating the identified reflected component of the time-varying electromagnetic signal.

5. The method according to claim 1, further comprising:
    analysing the receive electrical signal and repeatedly extracting the offset signal component from the receive electrical signal.

6. A method of measuring reflectivity of a substrate of an inductive cooking appliance, the method comprising:
    measuring reflectivity of the substrate in the presence of the background ambient component of electromagnetic radiation according to claim 1.

7. A method of measuring the reflectivity of an item of cookware disposed on a substrate of an inductive cooking appliance, the method comprising:
    measuring reflectivity of the substrate according to claim 6;
    placing the item of cookware on the substrate; and
    emitting another time-varying electromagnetic signal from the first side of the substrate, a portion of the another time-varying electromagnetic signal propagating through the substrate;
    receiving further electromagnetic radiation at the first side of the substrate, the further received electromagnetic radiation comprising a first reflected component of the time-varying electromagnetic signal reflected by the substrate and a second reflected component of the time-varying electromagnetic signal reflected by the item of cookware;
    translating the further received electromagnetic radiation to another receive electrical signal; and
    calculating the reflectivity additionally using the another receive electrical signal.

8. The method according to claim 7, further comprising:
    applying the gain factor to translate the further received electromagnetic radiation to another receive electrical signal, the gain factor applied being responsive to the background ambient component of electromagnetic radiation received.

9. The method according to claim 7, wherein
    the time-varying electromagnetic signal and the another time-varying electromagnetic signal share a common time-varying electrical drive signal; and
    calculating the reflectivity further comprises:
    calculating a fraction of the time-varying electromagnetic signal that is received as the second reflected component of the time-varying electromagnetic signal.

10. The method according to claim 9, wherein calculating the fraction comprises using the gain factor, the receive electrical signal, and the another receive electrical signal, and a predetermined reflectivity value of the substrate.

11. The method according to claim 10, wherein the reflectivity is calculated using the following equation:

$$\frac{(A_{meas2} - A_{meas1}) \times R_s}{A_{meas1}}$$

where $A_{meas2}$ is an amplitude of the another receive electrical signal, $A_{meas1}$ is an amplitude of the receive electrical signal compensated using the estimated gain factor, and $R_S$ is the predetermined reflectivity value of the substrate.

12. A method of heating cookware inductively, the method comprising:
- measuring reflectivity of an item of cookware according to claim 7;
- receiving a demand for inductive heating after measuring the reflectivity of the item of cookware; and
- generating an inductive electromagnetic heating signal in response to the demand for inductive heating.

13. A reflectivity measurement apparatus comprising:
- an electromagnetic illumination circuit configured to emit a time-varying electromagnetic signal from a first side of a substrate of a heating appliance, the time-varying electromagnetic signal propagating, when in use, through the substrate;
- a photodetector circuit configured to receive electromagnetic radiation at the first side of the substrate, the received electromagnetic radiation comprising a background ambient component of electromagnetic radiation and a reflected component of the time-varying electromagnetic signal reflected by the substrate; the photodetector circuit is configured to apply a gain factor to translate the received electromagnetic radiation to a receive electrical signal, the gain factor applied being responsive to the background ambient component of electromagnetic radiation received;
- a signal processing unit configured to identify an offset signal component from the receive electrical signal, the offset signal component arising from the background ambient component of the received electromagnetic radiation; wherein
- the signal processing unit is configured to estimate the gain factor from the offset signal component using a characterisation of the offset signal component; and
- the signal processing unit is configured to calculate the reflectivity using the receive electrical signal and the estimated gain factor.

14. An inductive heating apparatus comprising:
- a reflectivity measurement apparatus according to claim 13.

* * * * *